J. WATERLOO.
APPARATUS FOR CUTTING GLASS.
APPLICATION FILED MAY 8, 1916.

1,259,687.

Patented Mar. 19, 1918.
4 SHEETS—SHEET 1.

WITNESSES

INVENTOR
John Waterloo

J. WATERLOO.
APPARATUS FOR CUTTING GLASS.
APPLICATION FILED MAY 8, 1916.

1,259,687.

Patented Mar. 19, 1918.
4 SHEETS—SHEET 2.

WITNESSES
R A Balderson
J. B. Fleming

INVENTOR
John Waterloo
by Bakewell, Byrnes, Parmelee
Attys.

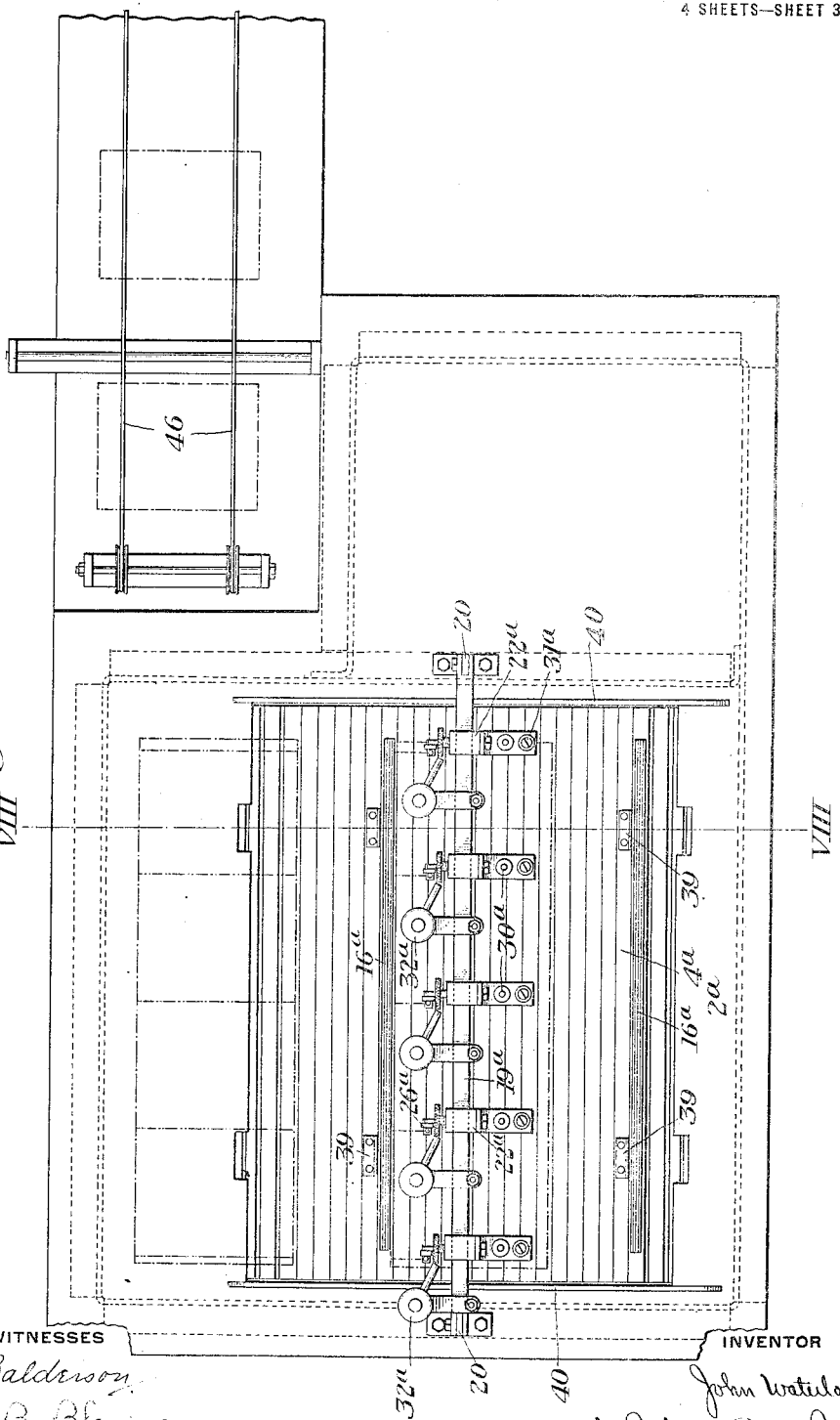

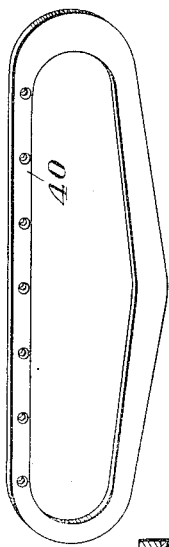
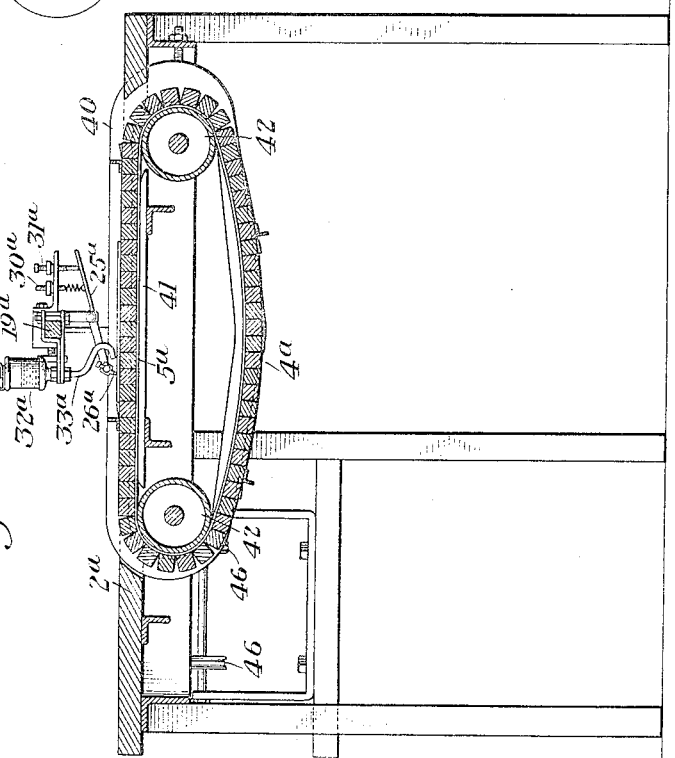
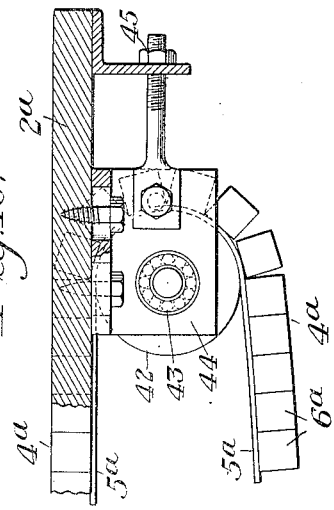

UNITED STATES PATENT OFFICE.

JOHN WATERLOO, OF MONONGAHELA, PENNSYLVANIA, ASSIGNOR TO WINDOW GLASS MACHINE COMPANY, OF PITTSBURGH, PENNSYLVANIA, A CORPORATION OF NEW JERSEY.

APPARATUS FOR CUTTING GLASS.

1,259,687.   Specification of Letters Patent.   Patented Mar. 19, 1918.

Application filed May 8, 1916. Serial No. 96,062.

*To all whom it may concern:*

Be it known that I, JOHN WATERLOO, a citizen of the United States, residing at Monongahela city, Washington county, Pennsylvania, have invented a new and useful Improvement in Apparatus for Cutting Glass, of which the following is a full, clear, and exact description, reference being had to the accompanying drawings, forming part of this specification, in which:

Fig. 7 is a plan view showing a modification.

Fig. 8 is a section on the line VIII—VIII of Fig. 7, and

Figs. 9, 10 and 11 are detail views of certain of the parts of the modified form of machine.

Figure 1:
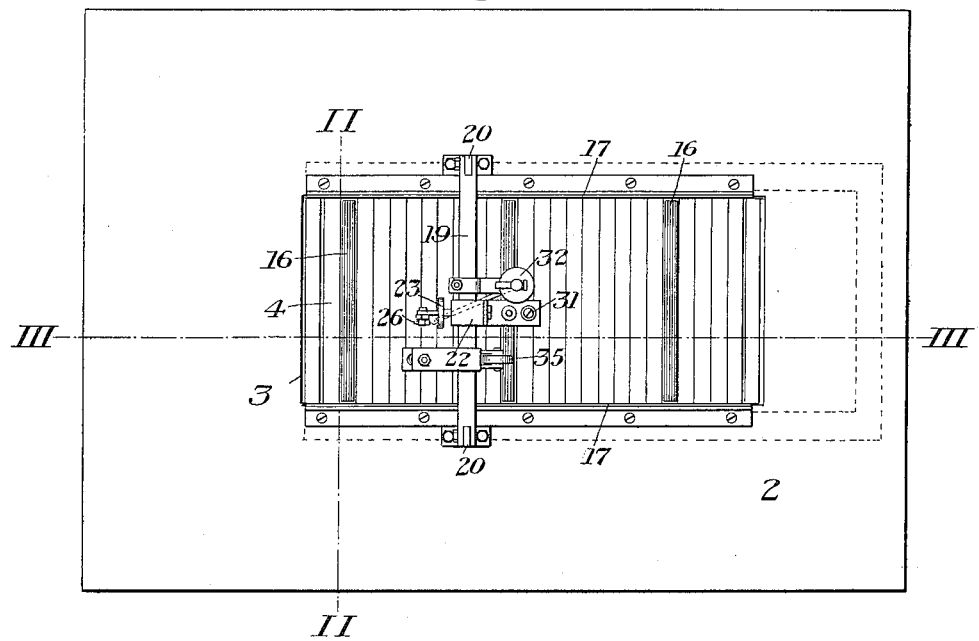
Figure 1 is a plan view of one form of apparatus embodying my invention.
Figure 2:
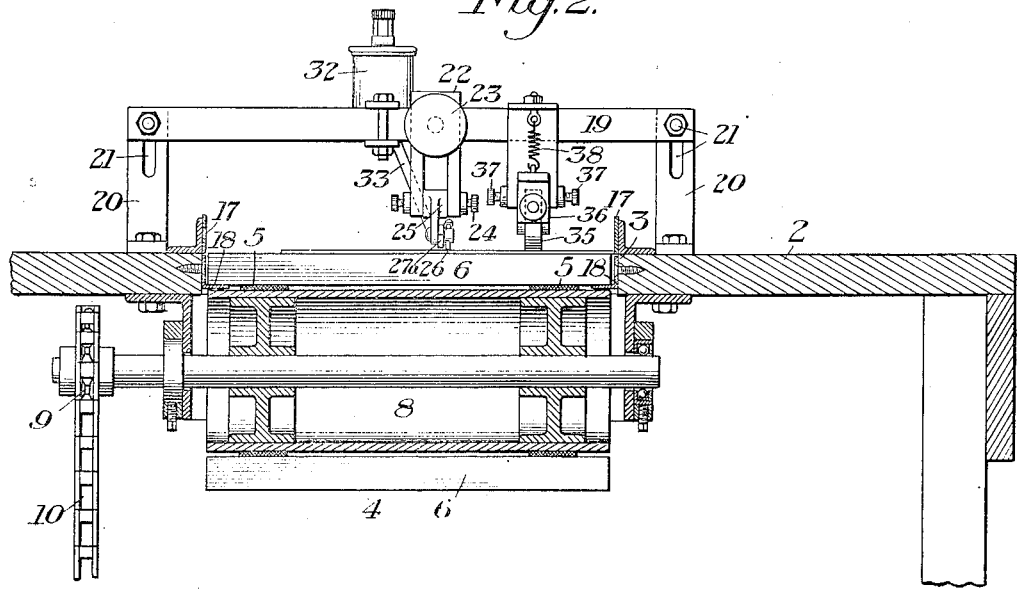
Figs. 2 and 3 are sections, taken on the lines II—II and III—III, respectively, of Fig. 1.
Figure 3:
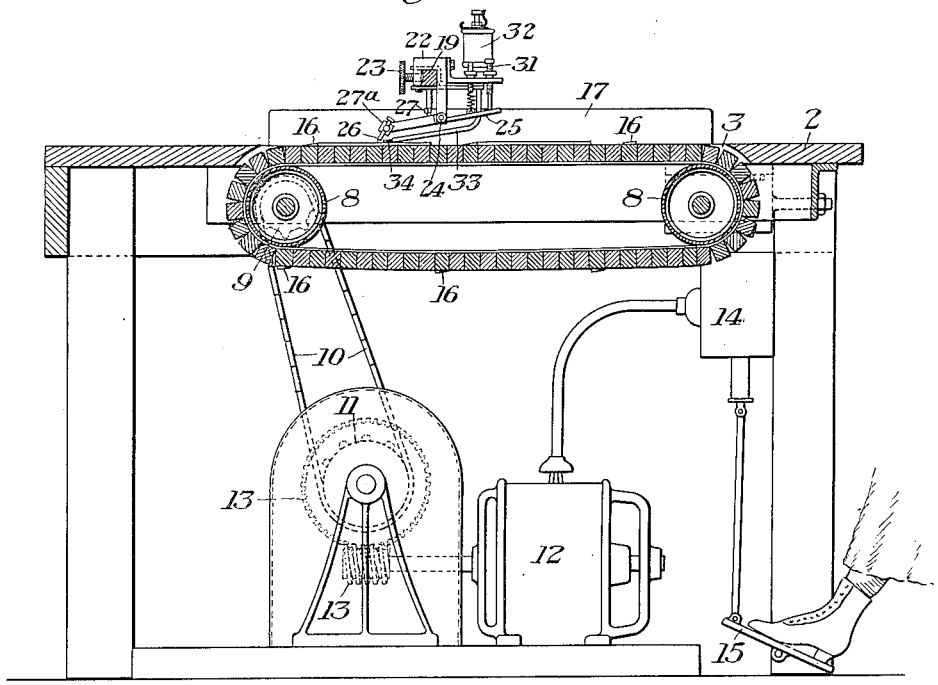

My invention has relation to glass cutting apparatus, and is designed to provide means by which glass sheets or strips may be rapidly and accurately cut into the desired sizes.

Referring first to that form of my invention shown in Figs. 1 to 6, inclusive, the numeral 2 designates a suitable horizontal table having a portion thereof cut away as shown at 3. 4 designates an endless conveyer which may conveniently be formed of two parallel endless belts 5 to which are secured a plurality of transverse slats or strips 6. This conveyer is mounted on suitable drums 8. I have shown the shaft of one of these drums as provided with a sprocket wheel 9 driven by a chain 10 from a sprocket wheel 11, which is in turn driven by an electric motor 12 through gearing 13. This motor may be controlled by any suitable switch, indicated at 14, and the latter may be operated by a foot pedal 15. I do not, however, limit myself to any particular driving mechanism for the conveyer, since any suitable type of such mechanism may be employed. Preferably, however, it will in all cases be of a character to be readily and quickly controlled by the operator who feeds the sheets to be cut.

The conveyer 4 is provided at intervals with transverse cleats or abutments 16 serving as stops for the forward edges of the glass sheets or plates to be cut. The conveyer is of a width to work in the cut-away portion 3 of the table, and the latter is provided at each side of the said cut-away portion with the side guides or gages 17. Either one of these side guides or gages may be employed, depending upon whether the operator works in a right handed or left handed manner. Supports 18, which may be in the form of angle irons, are provided to engage the end portions of the slats or strips 6, and thus prevent the upper working portion of the conveyer from sagging.

Figure 4:
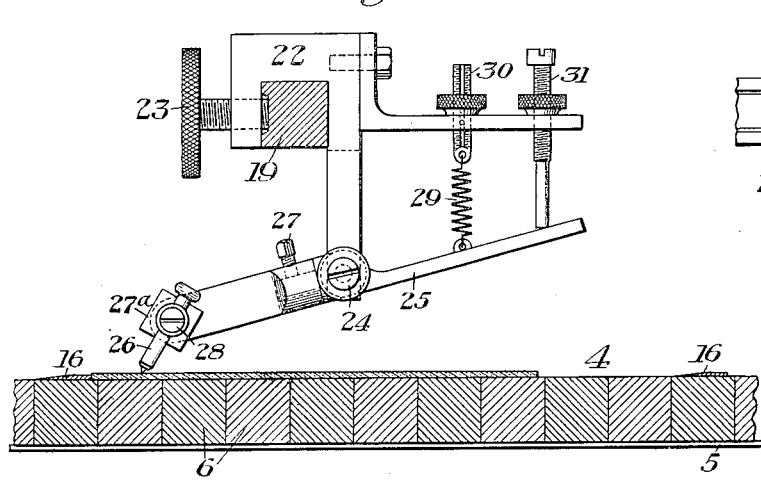
Figs. 4, 5 and 6 are detail views of certain of the parts, and hereinafter more fully described.
Figure 5:
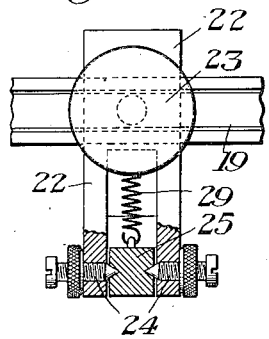
Figure 6:
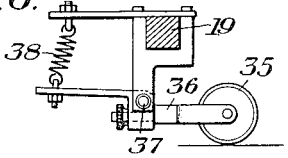

19 is a transverse bar supported on the table 2, above the conveyer, by means of the posts 20. The bar 19 is preferably capable of being adjusted as to height, as indicated at 21. 22 designates a hanger which adjustably engages the bar 19, and which can be secured in any desired position thereon by any suitable means such as the set screw 23. The depending arm of this hanger is bifurcated, and the arms of this bifurcated portion are provided with the trunnion screws 24, the points of which form bearings for a cutter carrier 25. This cutter carrier is preferably formed in two pieces, as indicated in Fig. 4, whereby the portion which carries the cutting tool 26 may be rotated with respect to the other portion, being secured in any desired adjustment by means of a screw 27. The cutting tool 26 is set in a holder 27$^a$ which is in turn pivoted to the cutter carrier at 28, thus providing means for any desired angular position of the tool. 29 is a tension spring connected to the other arm of the cutter carrier and having its opposite end connected to a tensioning device such as the screw 30. 31 is an adjustable stop against which the arm of the cutter carrier is drawn by the action of the spring 29. By these means I can obtain exactly the right pressure of the tool on the glass to be cut. 32 designates a lubricant cup having a discharge pipe 33 leading downwardly and having its nozzle provided with a wiper 34 which is placed just behind the cutting tool 26. The cup 32 preferably contains a lubricant, which is delivered by the wiper on the surface of the glass just in advance of the action of the cutting tool. I find that this greatly improves the cutting action of the tool.

If desired, especially with smaller sizes of sheets, any suitable means may be provided for holding the sheet securely on the conveyer. I have shown a device which may be employed for this purpose, this consisting of a small pressure wheel or roller 35 mounted on a lever arm 36 which is pivoted between the trunnion points 37, and has a tension spring 38 connected thereto.

The operation will be readily understood. The operator, standing at the right hand side of the table 2, feeds the sheets to be cut by hand onto the conveyer, placing the front edges of the sheets against the cleats or abutments 16, and with one of the lateral edges against one of the side guides or gages 17. The sheets are successively carried forward by the conveyer to the action of the cutting tool, by which they are scored or cut so that they can be readily broken apart.

In Figs. 7 to 11 I have shown a modified form of my invention adapted for use with larger sheets. In this form of my invention the conveyer 4ª may or may not be motor driven. In the construction shown I have shown the table as arranged to be moved by hand, it being provided with hand grips 39, for this purpose. It will also, of course, be understood that the form of my invention first described may also be operated by hand, if desired. The modified form of the machine is shown as having a plurality of cutting devices, each of which is similar to those before described, and each of which is provided with a lubricating arrangement, also similar to that before described. In this form of my invention I have omitted the pressure wheels or rollers, but these can be used if desired.

40 designates suitable side guides for the conveyer, and which act to prevent any lateral movement thereof. 41 designates supports which are placed underneath the upper or working portion of the conveyer to support it in a substantially true horizontal plane. The carrying drums 42 for the conveyer are preferably mounted on ball bearings 43 (Fig. 10). I preferably mount one of these drums in adjustable brackets 44 having adjusting means such as indicated at 45.

The operation of this form of machine is similar to that first described, except that a plurality of cuts or scores are simultaneously made. I desire it understood, however, that the machine shown in Fig. 1 may also be provided with a plurality of cutting devices. After the scored sheets have been broken apart, the separate plates or pieces are ready to be inspected and assorted. For this purpose, I preferably provide a moving conveyer 46, consisting of two relatively small cords or cables, across which the plates can be successively laid as they are taken from the cutting machine. While traveling on this conveyer, the operator can accurately determine the character of each plate and can throw out any defective plates, or otherwise assort the plates according to quality. This part of the apparatus forms the subject matter of my copending application Serial No. 96,061 filed May 8, 1916.

The advantages of my invention will be apparent to those familiar with the glass cutting art. By the provision of a moving conveyer, or table, upon which the sheets are placed and by which they are carried to the action of the cutter or cutters, the amount of glass which can be cut by a single operator is very greatly increased over what has heretofore been possible with the old styles of cutting tables. The cutting, while done rapidly, can be done very accurately, the cutters being capable of being set to exact positions, and the sheets to be cut being properly guided.

I do not desire to limit myself to the particular construction and arrangement of the parts herein shown and described, since it is obvious that many changes can be made without departing from the spirit and scope of my invention as defined in the appended claims. Thus, while I have obtained excellent results by a conveyer such as that described, in which the wooden strips are employed and which form at the upper portion of the conveyer an efficient table surface for supporting the glass, I may use any other suitable form of conveyer. This may be driven either by hand or by power in various ways. Other arrangements of cutting tools may also be employed.

I claim:

1. Apparatus for cutting glass, comprising a fixed table having an opening therein, an endles horizontal conveyer mounted so that the upper surface of its upper portion is substantially flush with the upper surface of said table, said conveyer having tranverse strips which form a substantially continuous glass supporting surface, the table having supporting members at the edges of said opening for engaging and supporting the end portions of said strips, a support extending transversely of the table and carrier and above the same, and a cutter carrier mounted on said support and adjustable transversely thereof, substantially as described.

2. Apparatus for cutting glass, comprising a fixed table having an opening therein, an endless horizontal conveyer mounted so that the upper surface of its upper portion is substantially flush with the upper surface of said table, said conveyer having transverse strips which form a substantially continuous glass supporting surface, the table having supporting members at the edges of said opening for and supporting the end portions of said strips, a support extending transversely of the table and carrier and above the same, and a plurality of cutter carriers mounted on said support and separately adjustable thereon toward and away from each other, substantially as described.

3. Apparatus for cutting glass, comprising a fixed table having an opening therein, an endless horizontal conveyer mounted so that the upper surface of its upper portion is substantially flush with the upper surface of said table, said conveyer having transverse strips which form a substantially continuous glass supporting surface, the table having supporting members at the edges of said opening for engaging and supporting the end portions of said strips, a support extending transversely of the table and carrier and above the same, and a cutter carrier mounted on said support and adjustable transversely thereof, together with a spring-pressed roller also mounted on said carriage and arranged to bear upon the glass being cut, substantially as described.

4. In glass cutting apparatus, the combination with an endless horizontal conveyer whose upper portion forms a movable glass-supporting table, of a plurality of pivoted cutters mounted over said table to cut in parallel lines, said cutters having means for separately tensioning them, and also for holding them in adjusted positions, substantially as described.

In testimony whereof, I have hereunto set my hand.

JOHN WATERLOO.

Witnesses:
Geo. B. Bleming,
H. M. Corwin.